(12) United States Patent
Lee et al.

(10) Patent No.: US 7,092,634 B2
(45) Date of Patent: Aug. 15, 2006

(54) BIDIRECTIONAL WAVELENGTH DIVISION MULTIPLEXED SELF-HEALING RING NETWORK COMPOSED OF ADD FIBER AND DROP FIBER

(75) Inventors: Chang Hee Lee, Daejon (KR); Sung Bum Park, Seoul (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 757 days.

(21) Appl. No.: 10/160,304

(22) Filed: May 31, 2002

(65) Prior Publication Data

US 2003/0067643 A1    Apr. 10, 2003

(30) Foreign Application Priority Data

Jun. 1, 2001    (KR) .............................. 2001-30881

(51) Int. Cl.
*H04B 10/20* (2006.01)
(52) U.S. Cl. .................. 398/59; 398/3; 398/5; 398/66; 398/67; 398/68; 398/70; 398/71; 398/72; 398/79; 398/82; 398/83; 398/84; 398/85; 398/45; 385/24; 385/37; 385/16; 385/17; 385/18

(58) Field of Classification Search ................. 398/59, 398/3, 5, 83, 79, 84, 85, 45, 50, 56, 66, 67, 398/68, 70, 71, 72, 82, 48; 385/24, 37, 16, 385/17, 18
See application file for complete search history.

(56) References Cited

U.S. PATENT DOCUMENTS

| | | | | |
|---|---|---|---|---|
| 5,576,875 | A * | 11/1996 | Chawki et al. | ............... 398/72 |
| 5,625,478 | A * | 4/1997 | Doerr et al. | .................. 398/4 |
| 6,351,582 | B1 * | 2/2002 | Dyke et al. | .................. 385/24 |
| 6,701,085 | B1 * | 3/2004 | Müller | .......................... 398/4 |

* cited by examiner

*Primary Examiner*—Hanh Phan
(74) *Attorney, Agent, or Firm*—Harness, Dickey & Pierce, P.L.L.C.

(57) ABSTRACT

Disclosed herein is a bidirectional wavelength division multiplexed self-healing ring network. The ring network includes a central office and a plurality of remote nodes. Two optical fibers each connect the central office and the remote nodes in a ring form to allow optical signals to be bidirectionally received and transmitted between the central office and the remote nodes. One of the two optical fibers is a drop fiber for transmitting optical signals from the central office to the remote nodes, while the other is an add fiber for transmitting optical signals from the remote nodes to the central office.

64 Claims, 12 Drawing Sheets

BIDIRECTIONAL WAVELENGTH DIVISION MULTIPLEXED SELF-HEALING RING NETWORK COMPOSED OF ADD FIBER AND DROP FIBER

BACKGROUND OF THE INVENTION

1. Field of the Invention

The present invention relates generally to a wavelength division multiplexed self-healing network, and more particularly to a bidirectional wavelength division multiplexed self-healing ring network, in which a central office and remote nodes are connected to one another using two optical fibers—add fiber and drop fiber. Optical signals are transmitted bidirectionally through the two optical fibers. And, the proposed ring network provides the self-healing function without the protection optical switch in the transmission path and doubles the transmission capacity in a normal operating state.

2. Description of the Prior Art

As the amount of the desired transmission traffic increases by the popularization of the Internet, the interest in optical networks that connect a central office to subscribers grows up.

The optical network should facilitate the provision of high-speed service to fulfill a demand for the high-speed service, and be economical to accommodate a large number of subscribers.

An optical network utilizing wavelength division multiplexing technology can transmit optical signals using various wavelengths regardless of transmission types and speeds, so communication networks can be effectively made to have a high-speed and a wide bandwidth.

In order to connect a central node to subscribers in the optical network, a remote node, which is placed near a group of subscribers, should be provided with a function of dropping and adding the signal assigned at each remote node.

Therefore, there is required a simple and economical wavelength division multiplexed optical network having add and drop functions.

The conventional wavelength division multiplexed access/Metro networks which connect a central office and remote nodes may be classified into three types: a unidirectional optical ring network using a single optical fiber, a unidirectional self-healing optical ring network using two optical fibers, and a mesh network.

In particular, an optical ring network has a relatively simple structure and can implement a self-healing function, so researches on the optical ring network have been actively carried out.

In a conventional unidirectional optical ring network, a central office and remote nodes are connected to one another by two optical fibers, one of the optical fibers transmits an optical signal in a normal operating state, and in case of a system failure, the ring network could be self-healed by detouring optical signals to the other optical fiber using an optical switch.

When optical signals are detoured through the other optical fiber in the conventional unidirectional optical ring network, the number of hops and a transmission distance of optical signals are increased in comparison with those in a normal state. Therefore, the quality of signals is deteriorated and expensive optical amplifiers may be employed to compensate for a loss due to the increased transmission distance.

Additionally, in the conventional optical ring network, signals are simultaneously added and dropped at each node, so the structure of the remote node is complicated and the requirements of the device are very strict. These features bring about increases of the system cost.

SUMMARY OF THE INVENTION

Accordingly, the present invention has been made keeping in mind the above problems occurring in the prior art, and an object of the present invention is to provide a bidirectional wavelength division multiplexed self-healing ring network. In the case of a system failure, the survivability of the ring network can be maintained without an additional optical switch and a protective optical fiber since wavelength division multiplexed optical signals are transmitted bidirectionally. Thus, the quality of signals can be secured and the need for an additional optical amplifier can be eliminated.

Another object of the present invention is to provide a bidirectional wavelength division multiplexed self-healing ring network, which is capable of doubling the transmission capacity by bidirectional transmission, thus facilitating system upgrade. And, one add multiplexer and one drop demultiplexer at each remote node only perform as one of the add and drop functions, respectively. And, the add multiplexer and the drop demultiplexer can be easily realized using wavelength division multiplexers and demultiplexers, or optical circulators and fiber gratings.

Still another object of the present invention is to provide a bidirectional wavelength division multiplexed self-healing ring network, which is capable of suppressing cross talk and relative intensity noise generated in the process of bidirectional transmission using inexpensive and low-grade optical components. Thus, the system can be realized cost-effectively.

In order to accomplish the above object, the present invention provides a bidirectional wavelength division multiplexed self-healing ring network, in which a central office and remote nodes are connected to one another by two optical fibers, the two optical fibers are assigned to add and drop fibers, respectively. And, optical signals can be bidirectionally transmitted between the central office and the remote nodes.

Each of the remote nodes is composed of an add multiplexer and a drop demultiplexer. The add multiplexer adds optical signals only to the add fiber, while the drop demultiplexer drops optical signals only from the drop fiber.

The add multiplexer and the drop demultiplexer can be simply constructed using wavelength division multiplexers and demultiplexers, respectively. Additionally, the add multiplexer and the drop demultiplexer can simply be constructed using optical circulators and fiber gratings.

Optical signals are bidirectionally transmitted from the central office to the remote nodes. Thus, even in the case of a system failure, the transmission path can be maintained without any increase of transmission distance and hops number.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
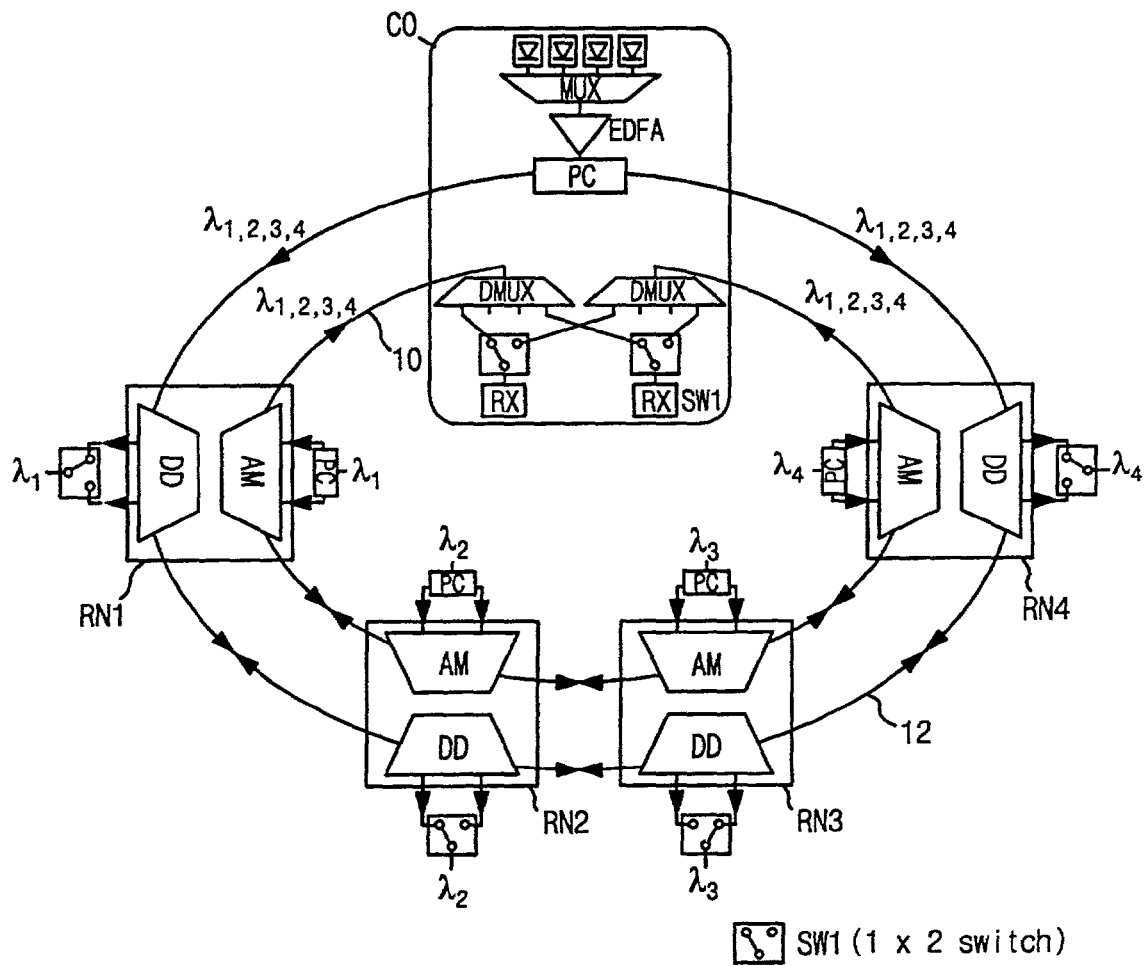
FIG. 1 is a diagram showing a configuration of a bidirectional wavelength division multiplexed self-healing ring network in accordance with a first embodiment of the present invention.

FIG. 1 is a diagram showing a configuration of a bidirectional wavelength division multiplexed self-healing ring network in accordance with a first embodiment of the present invention. The bidirectional wavelength division multiplexed self-healing ring network includes two optical fibers that constitute an add fiber 10 and a drop fiber 12, respectively.

A central office CO is divided into a wavelength division multiplexed optical receiving part and a wavelength division multiplexed optical transmission part. The wavelength division multiplexed optical transmission part is connected to the drop fiber 12 through its both transmission terminals, while the wavelength division multiplexed optical receiving part is connected to the add fiber 10 through its both receiving terminals.

Remote nodes RN1, RN2, RN3 and RN4 are each composed of an add multiplexer AM and a drop demultiplexer DD. The add fiber 10 is connected to both terminals of the add multiplexer AM, while the drop fiber 12 is connected to both terminals of the drop demultiplexer DD.

In the optical transmission part of the central office CO, an optical signal is multiplexed by a multiplexer MUX, and the weakened signals through the optical modulator and multiplexer are amplified by an erbium doped fiber amplifier EDFA. The amplified signal is divided into two signals by an optical coupler PC.

The wavelength division multiplexed optical signals at the central office CO are passed through the optical coupler PC to be divided into two signals, and the divided signals having the same wavelengths are transmitted through the drop fiber 12 in both directions.

The optical signals are transmitted to the remote nodes RN1, RN2, RN3 and RN4, and only signal of a wavelength assigned to each remote node RN1, RN2, RN3 and RN4 are dropped to the remote node RN1, RN2, RN3 and RN4, respectively.

On the contrary, each of the remote nodes RN1, RN2, RN3 and RN4 adds two groups of signals having the same wavelengths bidirectionally to the add fiber 10 using the add multiplexer AM connected, and transmits them to the central office CO.

An optical receiver RX of the central office CO selects and receives one of two groups of optical signals demultiplexed by two wavelength division demultiplexers DMUXs using two 1×2 optical switches SW1s.

Alternatively, the optical receiving part 20 of the central office CO simultaneously receives two groups of optical signals coming from both directions using two optical receivers RXs without 1×2 optical switches SW1s, and electrically selects one of the two groups of signals having better signal performance.

FIG. 1 shows a case where four remote nodes RN1, RN2, RN3 and RN4 are provided and four wavelength signals are transmitted bidirectionally from the central office CO.

In the first remote node RN1, two first wavelength $\lambda 1$ signals coming from both directions are simultaneously dropped through the drop demultiplexer DD. And one of the two first wavelength $\lambda 1$ signals is selected by a 1×2 optical switch SW1, and received, while two first wavelength $\lambda 1$ signals are simultaneously added through the add demultiplexer AM and bidirectionally transmitted to the central office CO.

In the second remote node RN1, two second wavelength $\lambda 2$ signals coming from both directions are simultaneously dropped through the drop demultiplexer DD. And one of the two second wavelength $\lambda 2$ signals is selected by a 1×2 optical switch SW1, and received, while two second wavelength $\lambda 2$ signals are simultaneously added through the add demultiplexer AM and transmitted to the central office CO in both directions.

In the same way, the third remote node RN3 is capable of adding and dropping third wavelength $\lambda 3$ signals, respectively, while the fourth remote node RN4 is capable of adding and dropping fourth wavelength λ4 signals, respectively.

Figure 2:
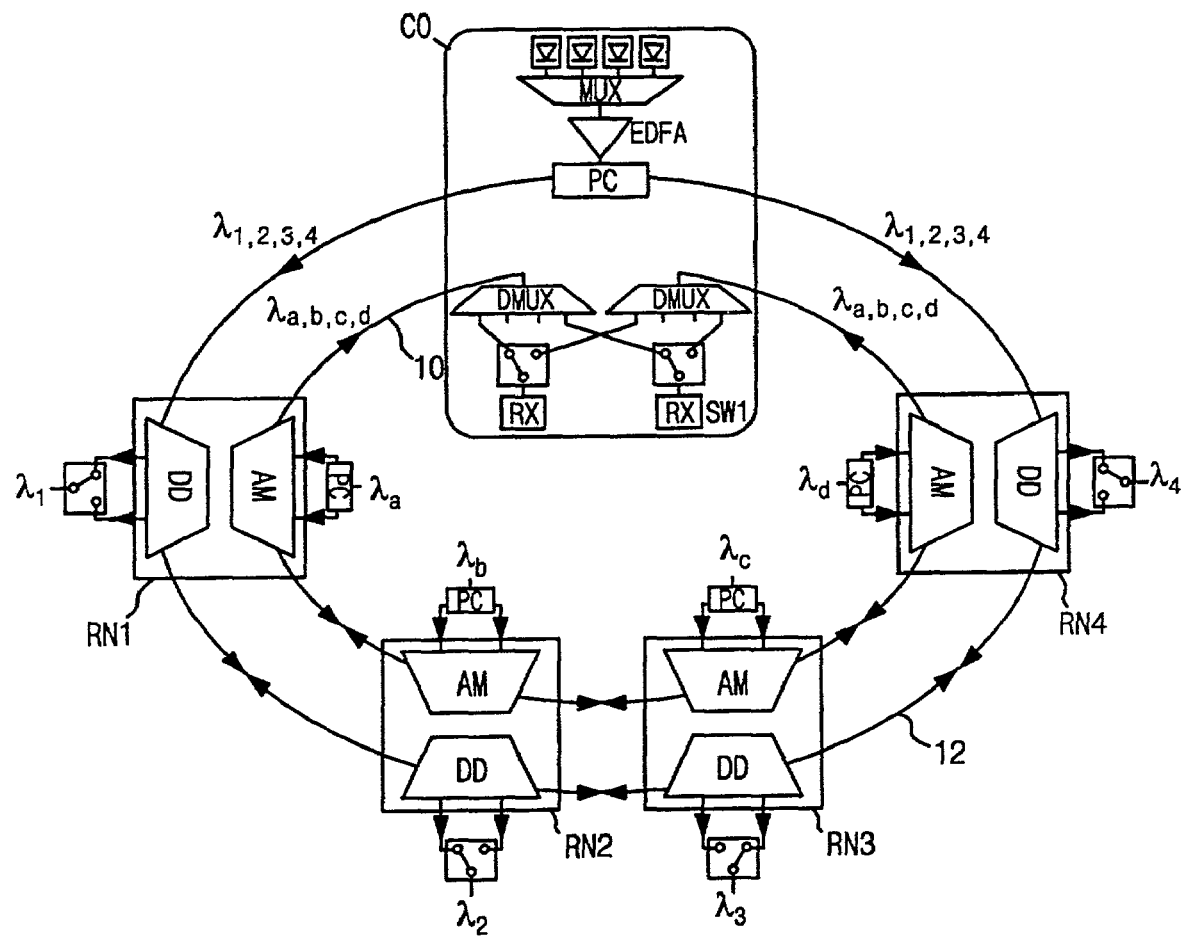
FIG. 2 is a diagram showing a configuration of a bidirectional wavelength division multiplexed self-healing ring network in accordance with a second embodiment of the present invention.

FIG. 2 is a diagram showing a configuration of a bidirectional wavelength division multiplexed self-healing ring network in accordance with the second embodiment of the present invention. This drawing shows the case, where the wavelengths of signals added are different from the wavelengths of signals dropped.

The wavelengths of signals added in remote nodes RN1, RN2, RN3 and RN4 can be made to be different from the wavelengths of signals dropped in remote nodes RN1, RN2, RN3 and RN4 in such a way that wavelengths λ1, λ2, λ3 and λ4 of wavelength division multiplexed optical signals transmitted from the central office CO to the remote nodes RN1, RN2, RN3 and RN4 are made to be different from wavelengths λa, λb, λc and λd of wavelength division multiplexed optical signals transmitted from the remote nodes RN1, RN2, RN3 and RN4 to the central office CO.

A path of the optical signals transmitted from the remote nodes RN1, RN2, RN3 and RN4 to the central office CO is separated from a path of the optical signals transmitted from the central office CO to the remote nodes RN1, RN2, RN3 and RN4 as an add fiber 10 and a drop fiber 12, respectively. Accordingly, the configuration of the self-healing ring network of this embodiment is not different from the one of the first embodiment in which the same wavelength signals are added and dropped.

In the first remote node RN1, two first wavelength signals λ1 coming bidirectionally from the central office CO are simultaneously dropped through a drop demultiplexer DD. And one of the two first wavelength signals λ1 is selected by a 1×2 optical switch SW1 and received, while two first wavelength signals λa are simultaneously added through an add demultiplexer AM and bidirectionally transmitted to the central office CO.

Figure 3:
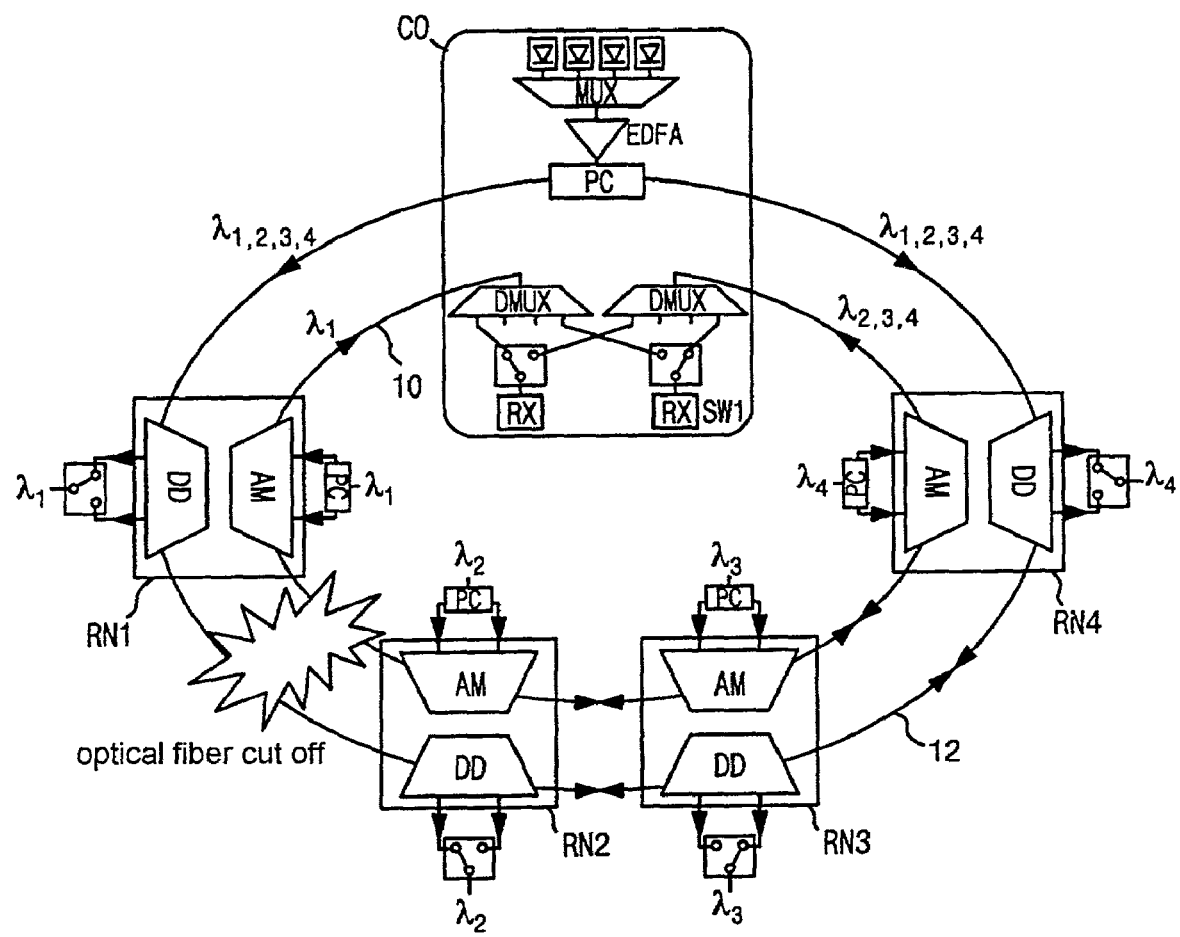
FIG. 3 is a diagram showing a process of healing the self-healing ring network of FIG. 1 when the self-healing ring network of FIG. 1 fails.

FIG. 3 is a diagram showing the process of healing the self-healing ring network of FIG. 1, when there exists network failure.

Since optical signals are bidirectionally transmitted, there is no trouble in communicating between the central office CO and the remote nodes RN1, RN2, RN3 and RN4 even in case of a system failure, for instance a sudden cutoff of the fiber 10 or 12.

For example, if the optical fiber 10 and 12 are cut off between the first and second remote nodes RN1 and RN2, optical power is not supplied to the drop channels that situated on the cutoff sides of the first, second, third and fourth remote nodes RN1, RN2, RN3 and RN4, thereby monitoring the state of a system.

That is, each of the remote nodes RN1, RN2, RN3 and RN4 can monitor the system using optical power supplied to one of two drop demultiplexers DD near the location of the system failure.

The central office CO demultiplexes wavelength division multiplexed optical signals coming bidirectionally, and can determine whether the system fails or not by monitoring power variations at reception terminals.

If the network fails, the first remote node RN1 drops the first wavelength λ1 signal transmitted from the central office CO in a counterclockwise direction, and adds the first wavelength λ1 signal to transmit it to the central office CO in a clockwise direction.

On the contrary, the second, third and fourth remote nodes RN2, RN3 and RN4 drop the second, third and fourth wavelength λ2, λ3 and λ4 signals transmitted from the central office CO in a clockwise direction, respectively, and adds the second, third and fourth wavelength λ2, λ3 and λ4 signals to transmit them to the central office CO in a counterclockwise direction, respectively.

Accordingly, even though a system failure occurs, the transmission paths of optical signals are not different from transmission paths in a normal state. And the system failure can be healed without using optical switches on optical path.

Figure 4:
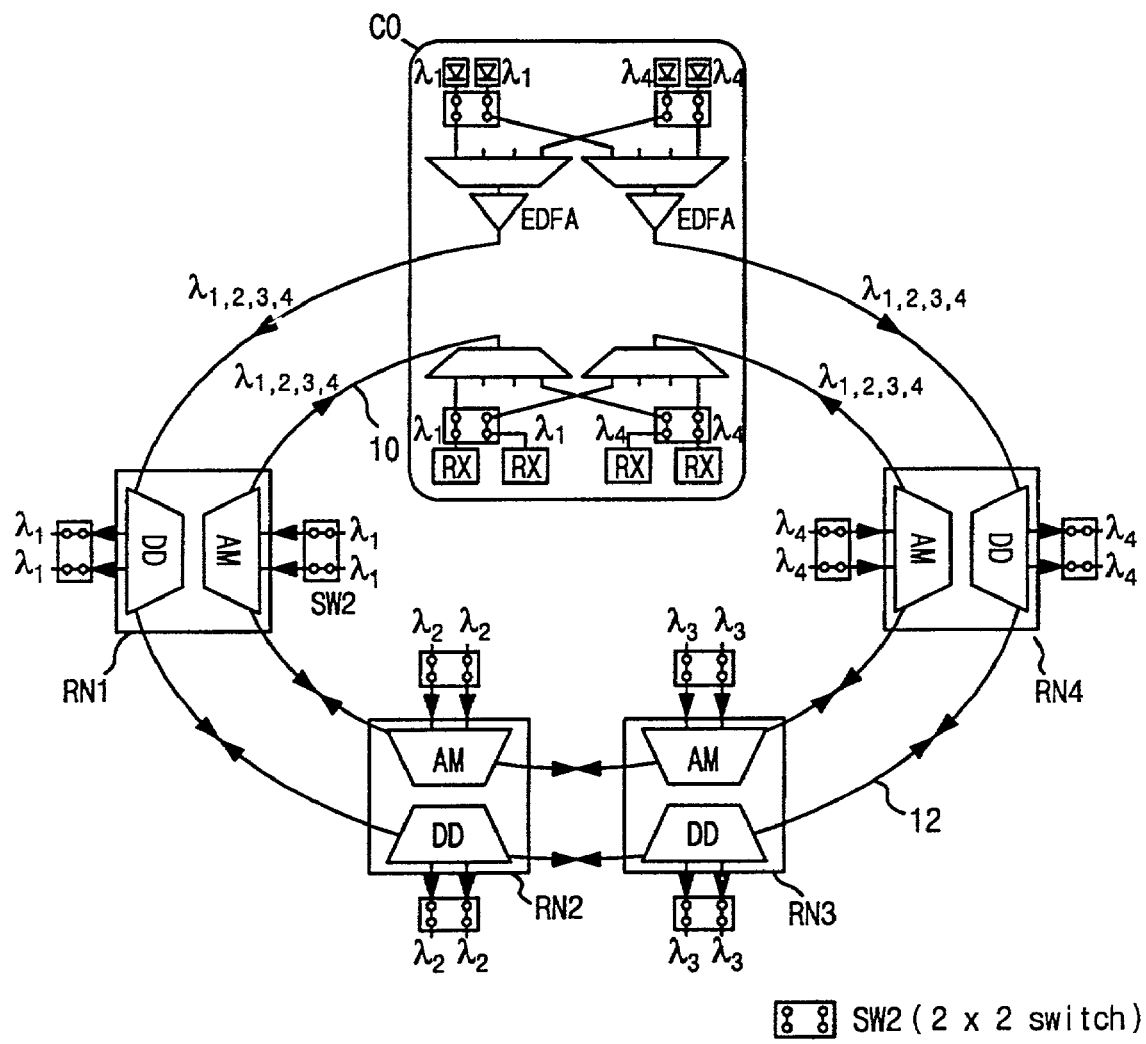
FIG. 4 is a diagram showing a bidirectional wavelength division multiplexed self-healing ring network in accordance with a third embodiment of the present invention.

FIG. 4 is a diagram showing a bidirectional wavelength division multiplexed self-healing ring network in accordance with the third embodiment of the present invention. The wavelength division multiplexed optical signals transmitted bidirectioally have the same wavelength but are modulated with different data.

Two groups of optical signals transmitted bidirectionally from the central office CO are allowed to have the same wavelengths, and modulated with different data by two kinds of optical modulators (not shown). A pair of differently modulated signals having the same wavelength are applied to two terminals of a 2×2 optical switch SW2, and two other terminals of the 2×2 optical switch SW2 are connected to the assigned input terminals of two multiplexers MUXs, respectively. The 2×2 optical switch SW2 establishes a path of optical signals so that wavelength signals modulated with the higher priority data may be transmitted in a counterclockwise direction in a normal state.

Accordingly, two groups of optical signals transmitted bidirectionally from the central office CO have the same wavelength but are modulated with different data. Of these optical signals, optical signals modulated into the higher priority data are transmitted through the drop fiber 12 in a counterclockwise direction, while the other signals are transmitted in a clockwise direction.

Since two groups of optical signals entering each of the remote nodes RN1, RN2, RN3 and RN4 have the same wavelengths but are modulated with different data, the two groups of optical signals having entered each of the remote nodes RN1, RN2, RN3 and RN4 are passed through the 2×2 optical switch SW2, and received by two different optical receivers RXs. Since the optical signals transmitted to each of the remote nodes RN1, RN2, RN3 and RN4 in a counterclockwise direction are modulated with higher priority data, the optical switches SW2s establish a path of the optical signals so that the optical signals modulated with higher priority data can be received by higher priority optical receivers RXs.

Two groups of optical signals bidirectionally added at the remote nodes RN1, RN2, RN3 and RN4 have the same wavelengths but are modulated with different data. The two differently modulated signals having the same wavelengths are bidirectionally transmitted through the add fiber. A path of the differently modulated signals having the same wavelengths is established by optical switches SW2s so that the higher priority signals may be transmitted in a clockwise direction.

In the optical receiving part of the central office CO, two groups of optical signals are demultiplexed by two demultiplexers DMUXs, and are received by the optical receivers RXs, respectively, because of the differently modulated two groups of optical signals. In this case, a path of the optical signals modulated with higher priority data is established by the optical switches SW2s so that these signals may be received by the higher priority optical receivers RXs.

In a normal state, the central office CO and each of the remote nodes RN1, RN2, RN3 and RN4 transmit different optical signals bidirectionally, so the bidirectional ring network can double the transmission capacity compared to the unidirectional ring network.

Alternatively, as shown in FIG. 2, the wavelengths of signals added are made to be different from those of signals dropped. Thus the wavelengths of signals passed through the add fiber are made to be different from those of signals passed through the drop fiber.

Figure 5:
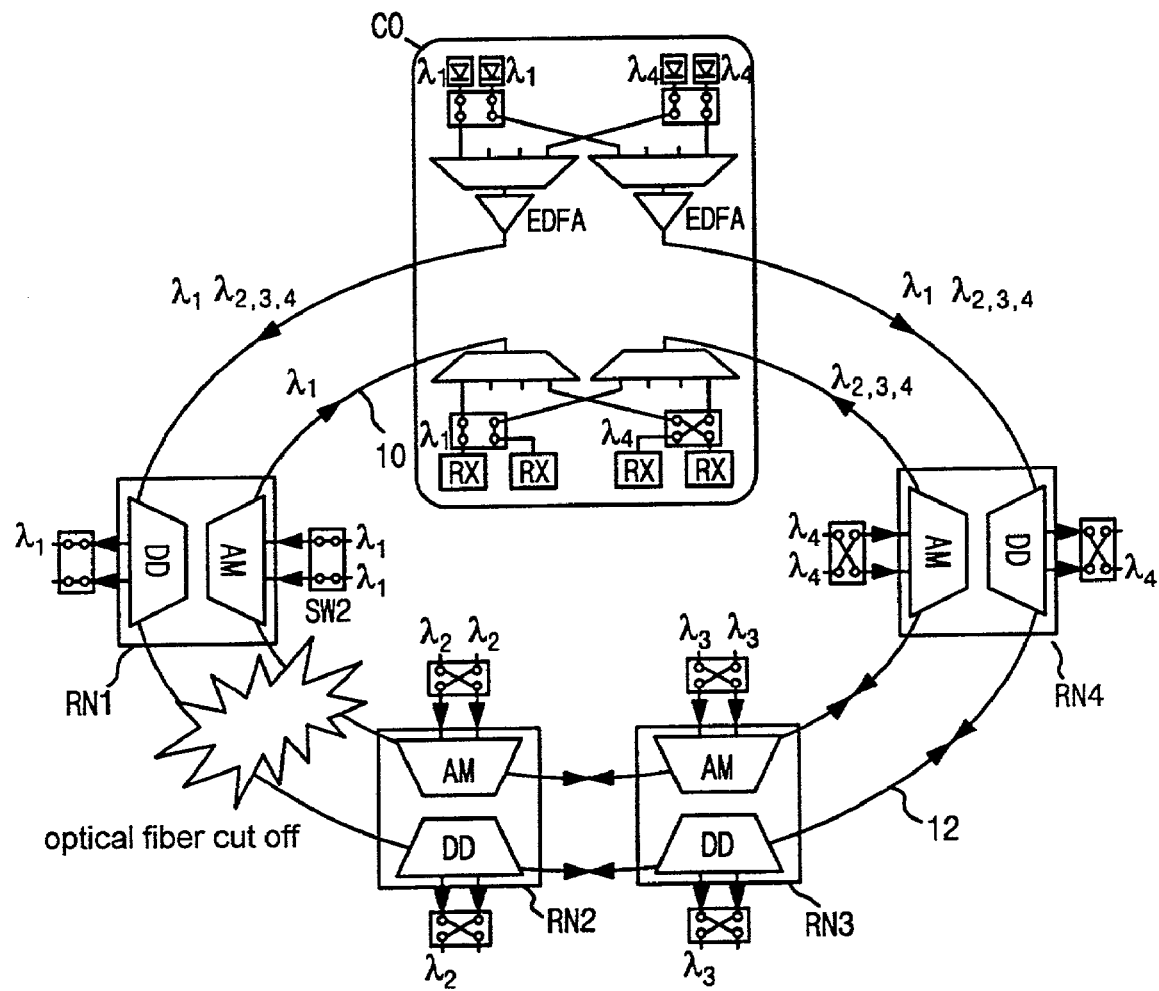
FIG. 5 is a diagram showing a process of healing the self-healing ring network of FIG. 4 when the self-healing ring network of FIG. 4 fails.

FIG. 5 is a diagram showing the process of healing the self-healing ring network of FIG. 4 when there exists network failure.

If the bidirectional ring network fails, one of two groups of optical signals are lost. Accordingly, the central node CO and each of the remote nodes RN1, RN2, RN3 and RN4 can monitor the failure and the position of optical fibers through the power of optical signals entering its receiving terminal. Additionally, the central node CO and each of the remote nodes RN1, RN2, RN3 and RN4 change the path of optical signals using 2×2 switches so as to survive higher priority optical signals, which are the more important than any one of the two groups of optical signals.

FIG. 5 shows the process of reestablishing paths of optical signals using 2×2 optical switches SW2s, when the optical fibers 10 and 12 are cut off between the first and second remote nodes RN1 and RN2. Here, in a normal state, the optical signals which the central office CO transmits in a counterclockwise direction and the optical signals which each of the remote nodes RN1, RN2, RN3 and RN4 transmits in a clockwise direction have had the higher priority.

The first remote node RN1 cannot receive optical signals in a clockwise direction, thus it receives higher priority first wavelength λ1 signals in a counterclockwise direction. On the other hand, the first remote node RN1 transmits first wavelength λ1 signals modulated with higher priority data to the central office CO in a clockwise direction. In the first remote node, the establishment of the path of the optical switch SW2s is not changed.

However, since the second, third and fourth nodes RN2, RN3 and RN4 cannot receive higher priority optical signals, the central office CO switches the path of optical signals using the optical switches SW2s of its receiving part so that the higher priority optical signals to be transmitted in a counterclockwise direction in a normal state may be transmitted in a clockwise direction. Optical switches SW2s connected to drop demultiplexers DD of the second, third and fourth nodes RN2, RN3 and RN4 change the path of the higher priority optical signals so that the higher priority optical signals transmitted from the central office CO in a clockwise direction can enter higher priority optical receivers RXs of the second, third and fourth nodes RN2, RN3 and RN4.

Additionally, optical switches SW2s connected to add multiplexers AM of the second, third and fourth nodes RN2, RN3 and RN4 change the path of the higher priority optical signals so that the higher priority optical signals can be transmitted to the central office CO in a counterclockwise direction.

The receiving part of the central office CO demultiplexes optical signals transmitted to its both terminals, and allows the demultiplexed higher priority optical signals to be received by higher priority optical receivers RXs using optical switches SW2s.

As a result, if the bidirectional ring network fails, the capacity of transmission is reduced to a half. However, the higher priority optical signals of the ring network can be easily survived.

Figure 6:
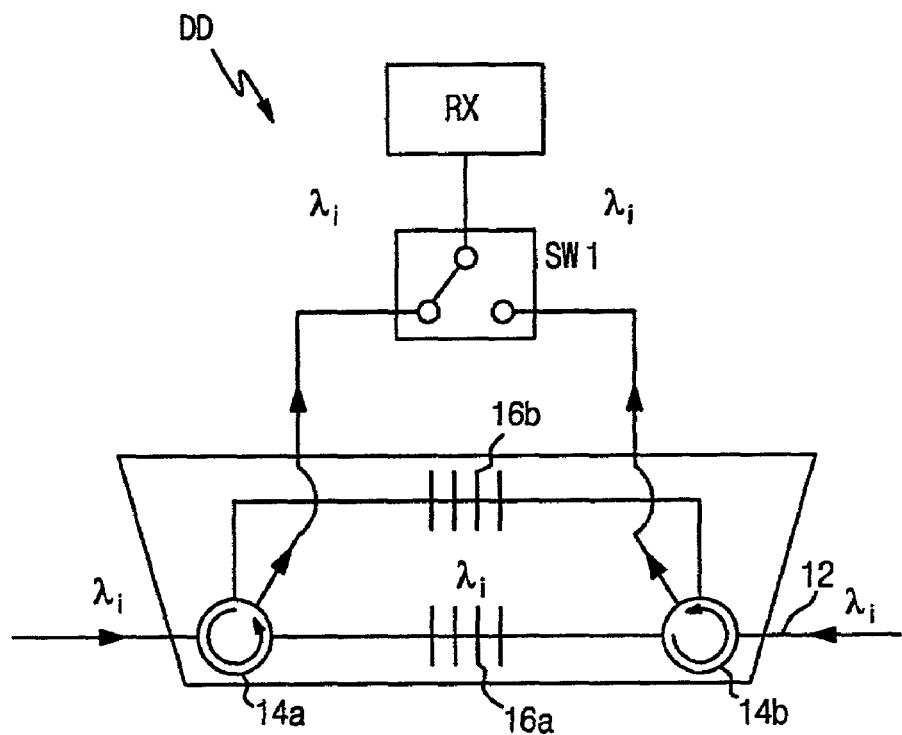
FIG. 6 is a diagram showing a configuration of a drop demultiplexer according to a first application of the present invention.
Figure 7:
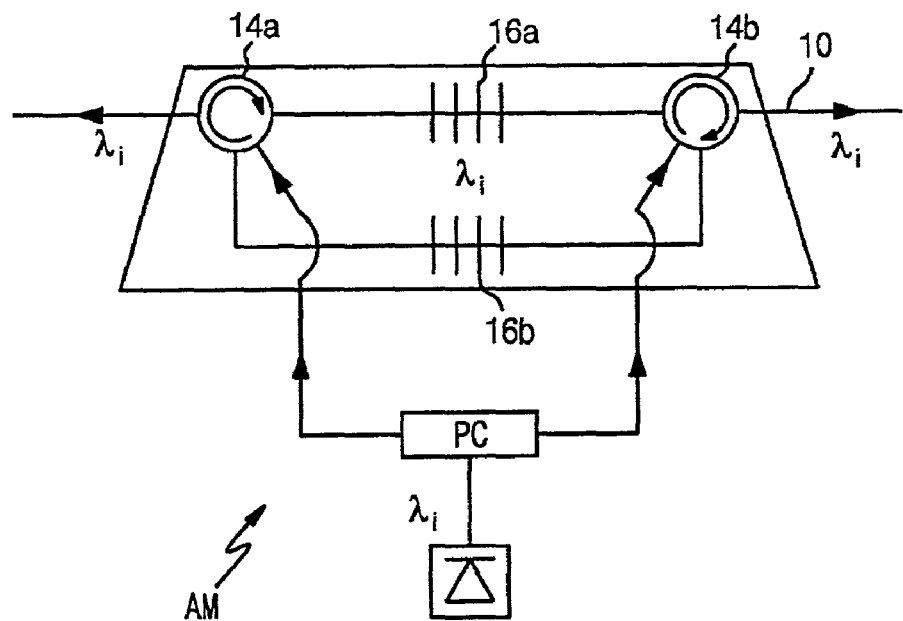
FIG. 7 is a diagram showing a configuration of an add multiplexer according to a first application of the present invention.

FIGS. 6 and 7 are diagrams showing the configuration of a drop demultiplexer and the configuration of an add multiplexer in accordance with the first application of the present invention, respectively. The drop demultiplexer and the add multiplexer are implemented in the case, where the wavelengths of signals transmitted from each remote node are the same as the wavelengths of signals received by the remote node as shown in FIG. 1.

FIG. 6 shows the drop demultiplexer DD that is constructed by disposing two four-port optical circulators 14a and 14b on both sides and connecting two same fiber gratings 16a and 16b parallel between the optical circulators 14a and 14b.

Tunable fiber gratings can be employed as the fiber gratings 16a and 16b to tune the wavelengths of signals dropped from both sides.

When two same groups of wavelength division multiplexed optical signals enter the optical circulators 14a and 14b connected to a drop fiber 12, two optical signals assigned to each remote node are reflected by the upper and lower same fiber gratings 16a and 16b and come out through drop terminals connected to the optical circulators 14a and 14b.

In such a case, optical signals except for the optical signals dropped are bidirectionally passed through the optical circulators 14a and 14b.

In FIG. 6, an dropped signal of optical signals entering from left to right is selected by the lower fiber grating 16a, while the other dropped signal from optical signals entering from right to left is selected by the upper fiber grating 16b.

The dropped optical signals are passed through a 1×2 optical switch SW1 and received by an optical receiver RX. The optical receiver RX selects one having a higher sensitivity of the two optical signals.

FIG. 7 shows the add multiplexer AM that is constructed by disposing two four-terminal optical circulators 14a and 14b on both sides and connecting two same fiber gratings 16a and 16b parallel between the optical circulators 14a and 14b.

Tunable fiber gratings can be employed as the fiber gratings 16a and 16b to tune the wavelengths of signals added to both sides.

In the add multiplexer AM, an optical signal is divided into two by an optical coupler PC, and the two optical signals having the same wavelength are sent to the optical circulators 14a and 14b through add terminals.

An optical signal entering through the left add terminal is varied in its path by the optical circulator 14a, reflected by the lower fiber grating 16b, and transmitted to the left through the optical circulator 14a.

In the same way, an optical signal entering through the right add terminal is varied in its path by the optical circulator 14b, reflected by the upper fiber grating 16a, and sent to the right through the optical circulator 14b.

Figure 8:
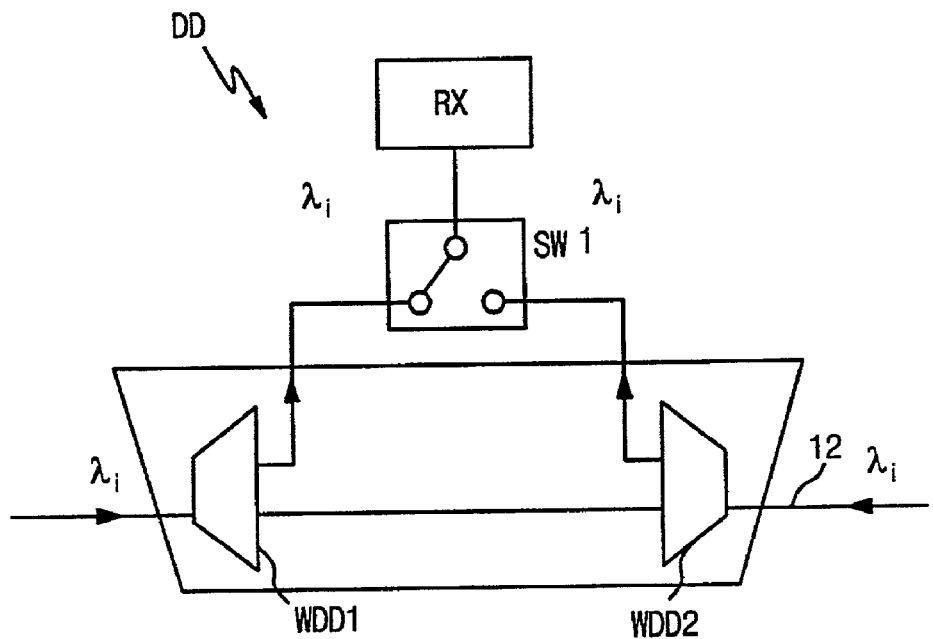
FIG. 8 is a diagram showing a configuration of a drop demultiplexer according to a second application of the present invention.
Figure 9:
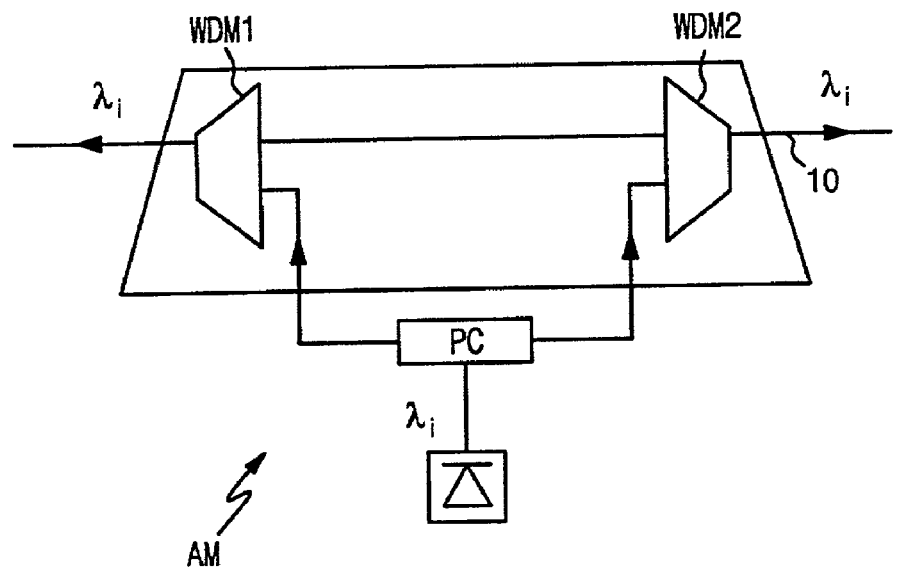
FIG. 9 is a diagram showing a configuration of an add multiplexer according to a second application of the present invention.

FIGS. 8 and 9 are diagrams showing the configuration of a drop demultiplexer and an add multiplexer in accordance with the second application of the present invention, respectively. The drop demultiplexer and the add multiplexer are implemented in the case where the wavelengths of signals transmitted from each remote node are the same as the wavelengths of signals received by the remote node as shown in FIG. 1.

FIG. 8 shows the drop demultiplexer DD that is constructed using two same wavelength division demultiplexers WDD1 and WDD2.

Tunable wavelength division demultiplexers can be employed as these wavelength division demultiplexers WDD1 and WDD2.

These two same three-port wavelength division multiplexers WDD1 and WDD2 are disposed on both sides with their pass ports connected to each other and their common ports connected to a drop fiber 12.

When two same groups of wavelength division multiplexed optical signals enter through the drop fiber 12, two optical signals assigned to each remote node are selected by these wavelength division multiplexers WDD1 and WDD2, and come out through reflection ports.

In such a case, optical signals except for the dropped optical signals are passed through the pass ports of these wavelength division multiplexers WDD1 and WDD2.

The dropped optical signals are passed through a 1×2 optical switch SW1 and received by an optical receiver RX. The optical receiver RX selects one having a higher sensitivity of the two optical signals.

FIG. 9 shows the add multiplexer AM that is constructed using two same wavelength division multiplexers WDD1 and WDD2.

Tunable wavelength division demultiplexers can be employed as these wavelength division demultiplexers WDD1 and WDD2.

The two same three-port wavelength division multiplexers WDD1 and WDD2 are disposed on both sides with their pass ports connected to each other and their common ports connected to an add fiber 10.

In the add multiplexer AM, an optical signal is divided into two by an optical coupler PC, and the two optical signals having the same wavelength are added through these wavelength division multiplexers WDD1 and WDD2 and bidirectionally transmitted through the add fiber 10 connected to the common ports of these wavelength division multiplexers WDD1 and WDD2.

Figure 10:
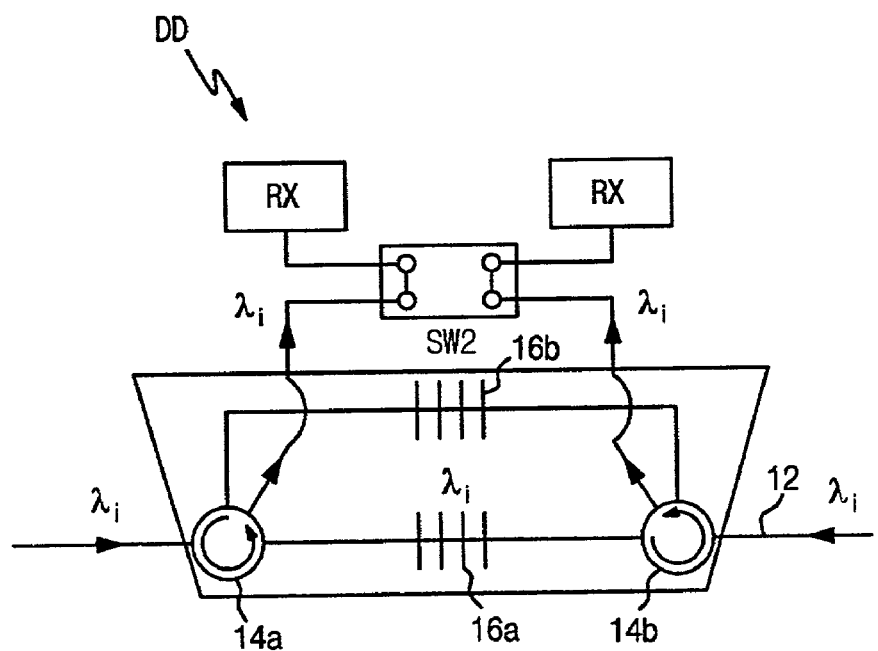
FIG. 10 is a diagram showing a configuration of a drop demultiplexer according to a third application of the present invention.
Figure 11:
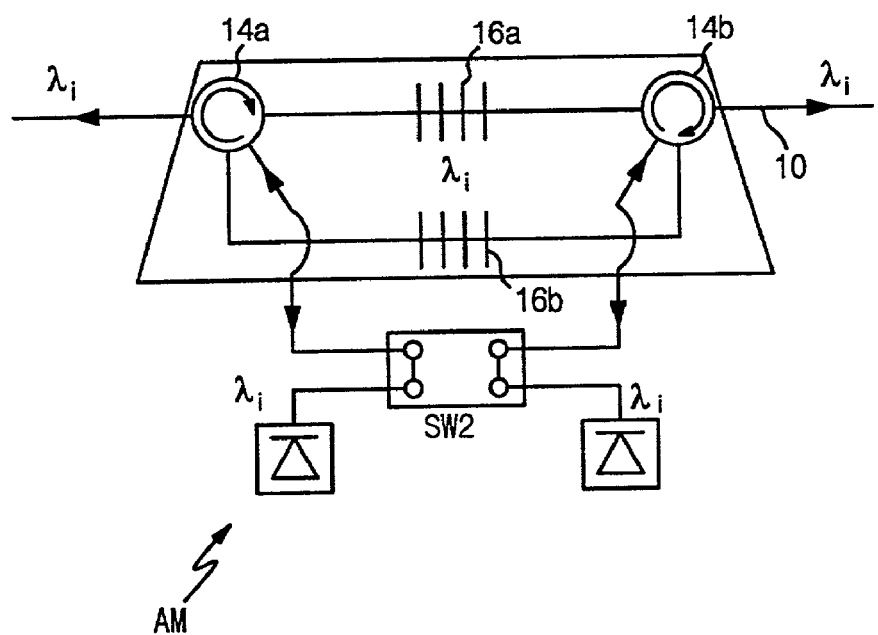
FIG. 11 is a diagram showing a configuration of an add multiplexer according to a third application of the present invention.

FIGS. 10 and 11 are diagrams showing the configuration of a drop demultiplexer and an add multiplexer in accordance with the third application of the present invention, respectively. The drop demultiplexer and the add multiplexer are implemented using optical circulators and fiber gratings in the case where the wavelengths of signals transmitted from each remote node are allowed to be the same as the wavelengths of signals received by the remote node, but the former and the latter are modulated with different data as shown in FIG. 4.

FIG. 10 shows the drop demultiplexer DD that is constructed by disposing two four-port optical circulators 14a and 14b on both sides, and connecting two same fiber gratings 16a and 16b parallel between the optical circulators 14a and 14b.

Tunable fiber gratings can be employed as the fiber gratings 16a and 16b to tune the wavelengths of signals dropped from both sides.

Optical signals are dropped as shown in FIG. 6, but received by two different optical receivers RXs because the dropped optical signals are modulated with different data.

A 2×2 optical switch SW2 disposed between the optical circulators 14a and 14b and the optical receivers RXs switches the paths of optical signals to receive higher priority optical signals first, in the case of a system failure.

FIG. 11 shows the add multiplexer AM that is constructed by disposing two four-port optical circulators 14a and 14b on both sides, and connecting two same fiber gratings 16a and 16b parallel between the optical circulators 14a and 14b.

Tunable fiber gratings can be employed as the fiber gratings 16a and 16b to tune the wavelengths of signals added to both sides.

In the add multiplexer AM, two same wavelength optical signals modulated with different data are added through two add ports in the same way shown in FIG. 7, and transmitted in both directions.

A 2×2 switch SW2 disposed between optical sources and the optical circulators 14a and 14b switches the paths of the optical signals to transmit higher priority optical signals first in the case of a system failure.

Figure 12:
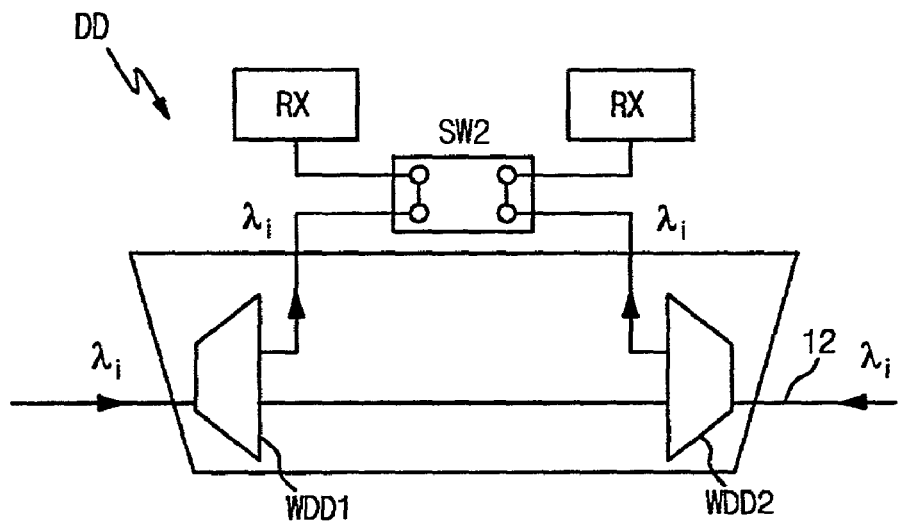
FIG. 12 is a diagram showing a configuration of a drop demultiplexer according to a fourth application of the present invention.
Figure 13:
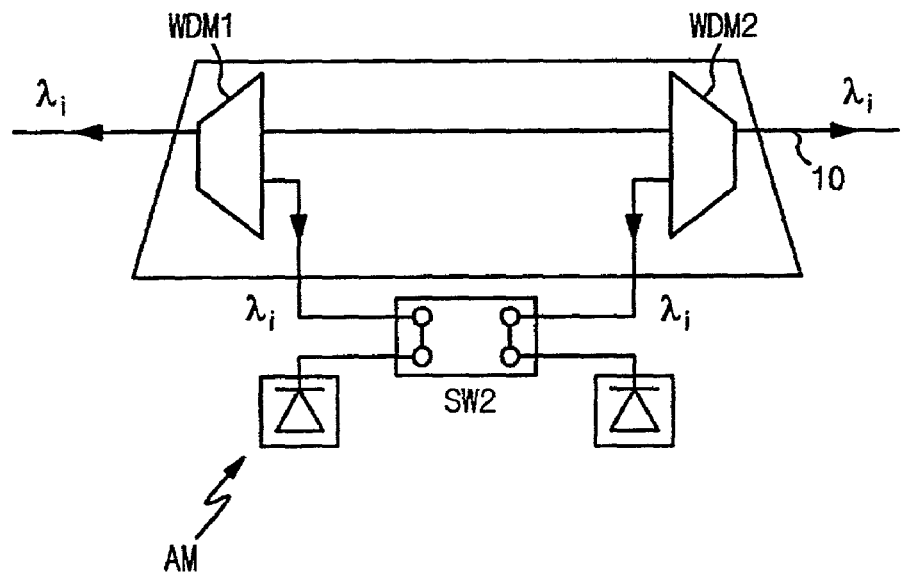
FIG. 13 is a diagram showing a configuration of an add multiplexer according to a fourth application of the present invention.

FIGS. 12 and 13 are diagrams showing the configuration of a drop demultiplexer and an add multiplexer in accordance with the fourth application of the present invention, respectively. The drop demultiplexer and the add multiplexer are implemented in the case where the wavelengths of signals transmitted from each remote node are the same as the wavelengths of signals received by the remote node, but the former and the latter are modulated with different data as shown in FIG. 4.

FIG. 12 shows the drop demultiplexer DD that is constructed using two same wavelength division demultiplexers WDD1 and WDD2.

Tunable wavelength division demultiplexers can be employed as the wavelength division demultiplexers WDD1 and WDD2.

The configuration of the drop demultiplexer DD is the same as that shown in FIG. 8, but the dropped optical signals are received by two optical receivers RXs because the dropped optical signals are modulated with different data.

A 2×2 switch SW2 disposed between the wavelength division demultiplexers WDD1 and WDD2 and the optical receivers RXs switches the paths of the optical signals to transmit higher priority optical signals first in the case of a system failure.

FIG. 13 shows the add multiplexer AM that is constructed using two same wavelength division multiplexers WDD1 and WDD2.

Tunable wavelength division demultiplexers can be employed as these wavelength division demultiplexers WDD1 and WDD2.

The configuration of the add multiplexer AM is similar to that shown in FIG. 9, but optical signals to be added to the add ports of the wavelength division multiplexers WDD1 and WDD2 are modulated with different data.

A 2×2 switch SW2 disposed between optical sources and the wavelength division demultiplexers WDD1 and WDD2 switches the paths of the optical signals to transmit higher priority optical signals first in the case of a system failure.

Figure 14:
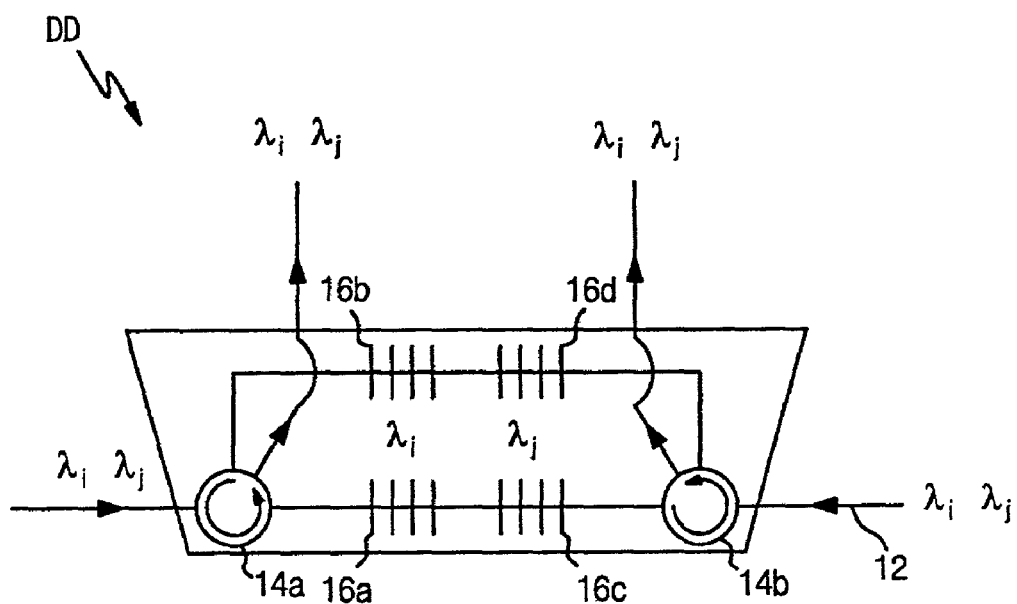
FIG. 14 is a diagram showing a configuration of a drop demultiplexer according to a fifth application of the present invention.
Figure 15:
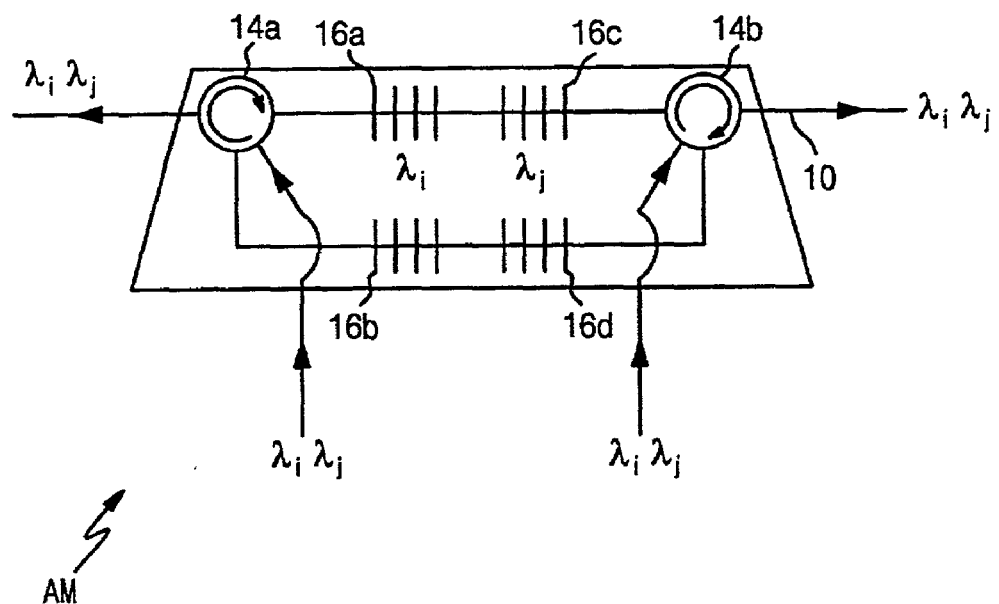
FIG. 15 is a diagram showing a configuration of an add multiplexer according to a fifth application of the present invention.

FIGS. 14 and 15 are diagrams showing the configuration a drop demultiplexer and an add multiplexer in accordance with the fifth application of the present invention, respectively. The drop demultiplexer and the add multiplexer are implemented using optical circulators and fiber gratings in the case where a plurality of wavelengths are bidirectionally transmitted and received at each of remote nodes in the bidirectional self-healing ring network.

FIG. 14 shows the drop demultiplexer DD, which is constructed by disposing two four-port optical circulators 14a and 14b on both sides, and connecting two groups of fiber gratings 16a, 16b, 16c and 16d parallel between the optical circulators 14a and 14b. The fiber gratings whose number is equal to the number of wavelengths to be dropped are connected in series.

The fiber gratings 16a and 16c connected in series on a lower side reflect only signals of wavelengths $\lambda i$ and $\lambda j$ desired to be dropped, respectively. The number of the fiber gratings 16a and 16c is equal to the number of the wavelengths $\lambda i$ and $\lambda j$ desired to be dropped.

In the same way, the fiber gratings 16b and 16d connected in series on an upper side reflect only signals of wavelengths $\lambda i$ and $\lambda j$ desired to be dropped, respectively, and the number of the fiber gratings 16b and 16d is equal to the number of the wavelengths $\lambda i$ and $\lambda j$ desired to be dropped.

In the case where two groups of optical signals bidirectionally transmitted are the same, the optical signals are received by the optical receiver RX through the 1×2 optical switch SW1 as shown in FIG. 6; while in the case where two groups of optical signals bidirectionally transmitted have the same wavelengths but are modulated with different data, the 2×2 optical switch SW2 which is connected between the optical circulators 14a and 14b and the optical receivers RXs switches the path of optical signals in the case of a system failure, so as to transmit higher priority optical signals first.

Referring to FIG. 15, two four-port optical circulators 14a and 14b are disposed on both sides, respectively, and two groups of fiber gratings 16a, 16b, 16c and 16d are connected in parallel between the optical circulators 14a and 14b. The fiber gratings whose number is equal to the number of wavelengths to be added are connected in series.

Fiber gratings 16a and 16c, and 16b and 16d of each group are connected in series to each other, and the two groups of fiber gratings 16a and 16c, and 16b and 16d are connected in parallel between the optical circulators 14a and 14b on upper and lower sides. Accordingly, the signals of wavelengths λi and λj desired to be added to the left are reflected by the lower fiber gratings 16b and 16d, while signals of wavelengths λi and λj desired to be added to the right are reflected by the upper fiber gratings 16a and 16c, thus being added bidirectionally.

In the case where two groups of optical signals to be bidirectionally added are the same, the two groups of optical signals are added using the optical coupler PC as shown in FIG. 7; while in the case where two groups of optical signals bidirectionally transmitted have the same wavelengths but are modulated with different data, the 2×2 optical switch SW2 which is connected between the optical sources and the optical circulators 14a and 14b switches the path of optical signals in the case of a system failure, so as to transmit higher priority optical signals first.

Figure 16:
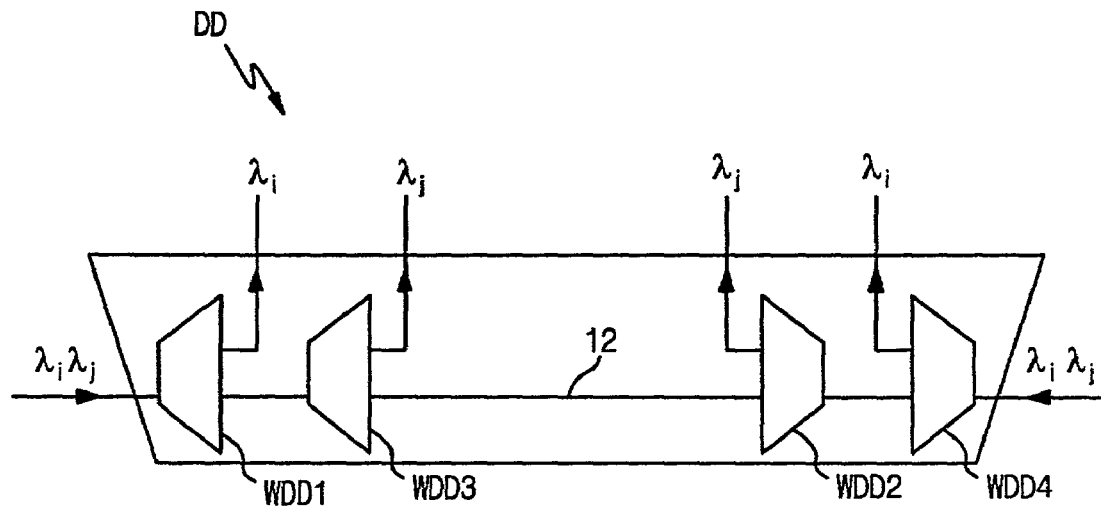
FIG. 16 is a diagram showing a configuration of a drop demultiplexer according to a sixth application of the present invention.
Figure 17:
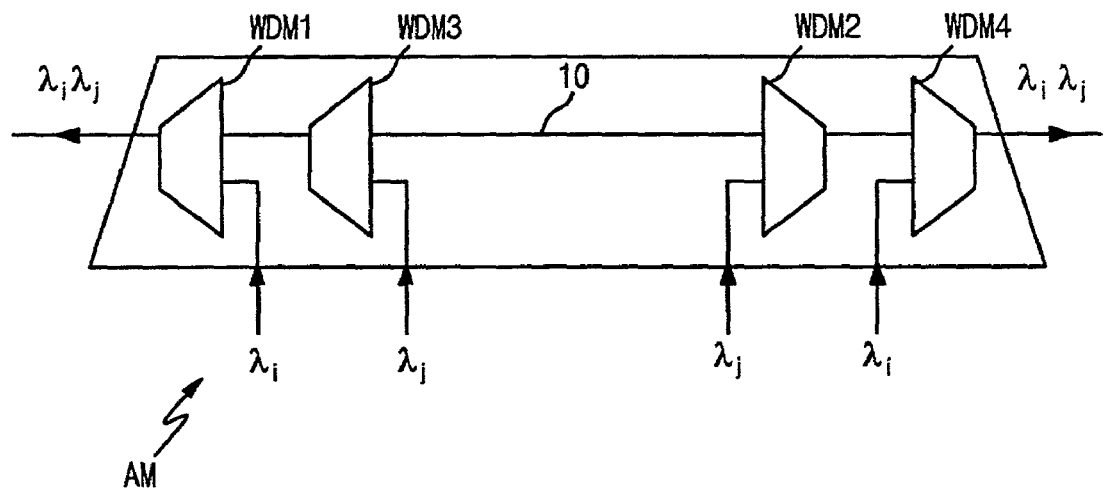
FIG. 17 is a diagram showing a configuration of an add multiplexer according to a sixth application of the present invention.

FIGS. 16 and 17 are diagrams showing the configuration a drop demultiplexer and an add multiplexer in accordance with the sixth application of the present invention, respectively. The drop demultiplexer and the add multiplexer are implemented as wavelength division demultiplexers/multiplexers in the case where a plurality of wavelengths are bidirectionally transmitted and received at each of remote nodes in the bidirectional self-healing ring network of the present invention.

FIG. 16 shows the drop demultiplexer DD that is constructed by connecting a plurality of wavelength division demultiplexers WDD1, WDD2, WDD3 and WDD4 in series.

Wavelength division multiplexers WDD1 and WDD3, or WDD2 and WDD4 whose number is equal to the number of wavelengths to be dropped are connected in series, so as to simultaneously drop a plurality of wavelengths.

In the case where two groups of optical signals bidirectionally transmitted are the same, the optical signals are received by the optical receiver RX through the 1×2 optical switch SW1 as shown in FIG. 8; while in the case where two groups of optical signals bidirectionally transmitted have the same wavelengths but are modulated with different data, the 2×2 optical switch SW2 which is connected between the wavelength division demultiplexers WDD1, WDD2, WDD3 and WDD4 and the optical receivers RXs switches the path of optical signals in the case of a system failure, so as to transmit higher priority optical signals first.

FIG. 17 shows the add multiplexer AM that is constructed by connecting a plurality of wavelength division multiplexers WDM1, WDM2, WDM3 and WDM4 in series.

Wavelength division multiplexers WDM1 and WDM3, or WDM2 and WDM4 whose number is equal to the number of wavelengths to be dropped are connected in series to form a group of wavelength division multiplexers, so as to simultaneously add a plurality of wavelengths.

In the case where two groups of optical signals bidirectionally added are the same, two groups of optical signals having the same wavelengths are added using the optical coupler PC as shown in FIG. 9; while in the case where two groups of optical signals bidirectionally added have the same wavelengths but are modulated with different data, the 2×2 optical switch SW2 which is connected between the optical sources and the wavelength division multiplexers WDM1, WDM2, WDM3, WDM3 and WDM4 switches the path of optical signals in the case of a system failure, so as to transmit higher priority optical signals first.

Figure 18:
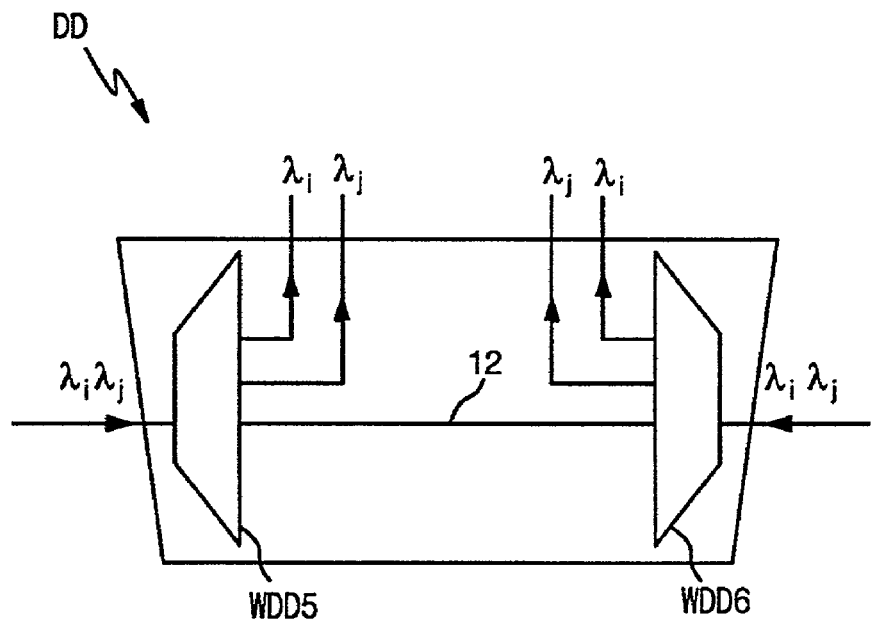
FIG. 18 is a diagram showing a configuration of a drop demultiplexer according to a seventh application of the present invention.
Figure 19:
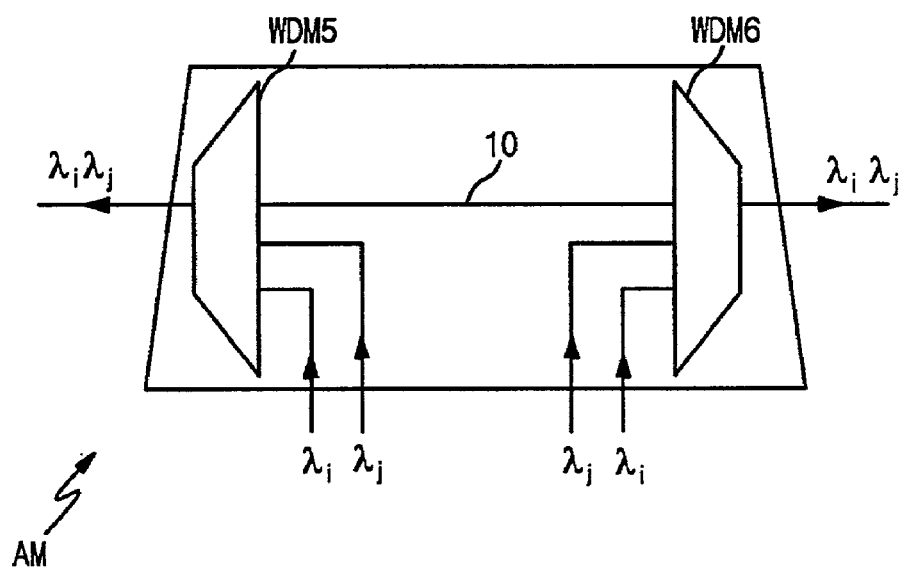
FIG. 19 is a diagram showing a configuration of an add multiplexer according to a seventh application of the present invention.

FIGS. 18 and 19 are diagrams showing the configuration a drop demultiplexer and an add multiplexer in accordance with the seventh application of the present invention, respectively. The drop demultiplexer and the add multiplexer are implemented as multi-channel wavelength division demultiplexers/multiplexers, in the case where a plurality of wavelengths are bidirectionally transmitted and received at each remote nodes in the bidirectional self-healing ring network of the present invention.

FIG. 18 shows the drop demultiplexer DD that is constructed using two multi-channel wavelength division demultiplexers WDD5 and WDD6 each of which can simultaneously drop signals having plural wavelengths λi and λj.

Of wavelength division multiplexed optical signals bidirectionally transmitted, only signals having plural wavelengths λi and λj assigned to each remote node can be simultaneously dropped using the multi-channel wavelength division demultiplexers WDD5 and WDD6.

In the case where two groups of optical signals bidirectionally transmitted are the same, the optical signals are received by the optical receiver RX through the 1×2 optical switch SW1 as shown in FIG. 8; while in the case where two groups of optical signals bidirectionally transmitted have the same wavelengths but are modulated with different data, the 2×2 optical switch SW2 which is connected between the multi-channel wavelength division demultiplexers WDD5 and WDD6 and the optical receivers RXs switches the path of optical signals in the case of a system failure, so as to transmit higher priority optical signals first.

FIG. 19 shows the add multiplexer AM that is constructed using two multi-channel wavelength division multiplexers WDM5 and WDM6 each of which can simultaneously add signals having plural wavelengths λi and λj.

The signals having plural wavelengths λi and λj desired to be added can be simultaneously added by allowing the signals to enter the plural add ports of each of the multi-channel wavelength division multiplexers WDM5 and WDM6.

In the case where two groups of optical signals bidirectionally added are the same, two groups of optical signals having the same wavelengths are added using the optical coupler PC as shown in FIG. 9; while in the case where two groups of optical signals bidirectionally added have the same wavelengths but are modulated with different data, the 2×2 optical switch SW2 which is connected between the optical sources and the multi-channel wavelength division multiplexers WDM5 and WDM6 switches the path of optical signals in the case of a system failure, so as to transmit higher priority optical signals first.

Optical components such as a grating structure or multi-layer thin film elements can be used instead of the fiber gratings 16*a*, 16*b*, 16*c* and 16*d*. Additionally, arrayed-waveguide grating multiplexers can be used instead of the multi-channel wavelength division multiplexers/demultiplexers WDM5, WDM6, WDD5 and WDD6. This use of a grating structure, the multi-layer thin film elements and the arrayed-waveguide grating multiplexers falls under the scope of the present invention.

As described above, the present invention provides a bidirectional wavelength division multiplexed self-healing ring network in which optical fibers connecting a central office and remote nodes are assigned to an add fiber and a drop fiber. The optical signals are added to the add fiber and dropped from the drop fiber at the remote nodes. Accordingly, the bidirectional wavelength division multiplexed self-healing ring network transmits wavelength division multiplexed optical signals bidirectionally, so the survivability of the ring network can be maintained without an additional optical switch and a protective optical fiber in the case of a system failure. Thus, the quality of signals can be secured and the need for an additional optical amplifier can be eliminated.

In addition, in accordance with the bidirectional wavelength division multiplexed ring network of the present invention, the transmission capacity can be doubled by bidirectional transmission, thus facilitating system upgrade. And, one add multiplexer and one drop demultiplexer in each remote node only perform as one of the add and drop functions, respectively. And, the add multiplexer and the drop demultiplexer can be easily realized using wavelength division multiplexers and demultiplexers, or optical circulators and fiber gratings.

In addition, in accordance with the bidirectional wavelength division multiplexed ring network of the present invention, cross talk and relative intensity noise generated in the process of bidirectional transmission can be suppressed using inexpensive and low-grade optical components. Thus, the system can be realized cost-effectively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bidirectional wavelength division multiplexed self-healing ring network, comprising:
    A central office;
    A plurality of remote nodes; and
    two optical fibers connecting the central office and the remote nodes in a ring form to allow optical signals to be bidirectionally received and transmitted between the central office and the remote nodes;
    wherein one of the two optical fibers is a drop fiber for transmitting optical signals from the central office to the remote nodes and the other is an add fiber for transmitting optical signals from the remote nodes to the central office;
    wherein wavelengths of wavelength division multiplexed signals transmitted from the remote nodes to the central office through the add fiber in a clockwise direction are allowed to be the same as wavelengths of wavelength division multiplexed signals transmitted from the remote nodes to the central office through the add fiber in a counterclockwise direction; and
    wherein an optical receiving part of the central office demultiplexes two groups of wavelength division multiplexed optical signals transmitted through the add fiber in both directions, respectively, selects one group of optical signals transmitted in a single direction using a 1×2 optical switch and receives the optical signals using a receiver, or receives two groups of optical signals transmitted in both directions using two optical receivers and selects one group of optical signals having better signal performance.

2. The ring network according to claim 1,
    wherein wavelengths of wavelength division multiplexed signals transmitted from the central office to the remote nodes through the drop fiber in a clockwise direction are allowed to be the same as wavelengths of wavelength division multiplexed signals transmitted from the central office to the remote nodes through the drop fiber in a counterclockwise direction;
    wherein when two groups of wavelength division multiplexed optical signals having the same wavelengths enter each of the remote nodes through drop demultiplexers connected to the drop fiber, the remote node selects and drops optical signals having wavelengths assigned to the remote node, and receives one group of optical signals coming in a single direction, or receives two groups of optical signals coming in both directions and selects one group of optical signals having better signal performance;
    wherein the drop demultiplexer is provided with two four-port optical circulators and the upper and the lower same fiber gratings are connected in parallel between the optical circulators,
    so that when two groups of wavelength division multiplexed optical signals enter the optical circulators, a path of optical signals is divided into the upper and the lower paths by the optical circulators, only optical signals of wavelengths desired to be dropped are reflected by the upper and the lower same fiber gratings and received the optical signals through drop terminals connected to the optical circulators, and optical signals except for the optical signals dropped are passed through the optical circulators.

3. The ring network according to claim 2, wherein when the signals dropped bidirectionally have plural wavelengths, fiber gratings of each group are equal to the wavelengths in number, and connected in serial to drop a plurality of wavelengths simultaneously.

4. The ring network according to claim 3, wherein the fiber gratings are replaced by optical components each having a grating structure.

5. The ring network according to claim 3, wherein the fiber gratings are replaced by multi-layer thin film elements.

6. The ring network according to claim 2, wherein the fiber gratings are tunable so as to tune the optical signals dropped from its both sides.

7. The ring network according to claim 6, wherein the fiber gratings are replaced by optical components each having a grating structure.

8. The ring network according to claim 6, wherein the fiber gratings are replaced by multi-layer thin film elements.

9. The ring network according to claim 2, wherein the fiber gratings are replaced by optical components each having a grating structure.

10. The ring network according to claim 2, wherein the fiber gratings are replaced by multi-layer thin film elements.

11. The ring network according to claim 1, wherein wavelengths of wavelength division multiplexed signals transmitted from the central office to the remote nodes through the drop fiber in a clockwise direction are allowed to be the same as wavelengths of wavelength division multiplexed signals transmitted from the central office to the remote nodes through the drop fiber in a counterclockwise direction; wherein when two groups of wavelength division multiplexed optical signals having the same wavelengths enter each of the remote nodes through drop demultiplexers connected to the drop fiber, the remote node selects and drops optical signals having wavelengths assigned to the remote node, and receives one group of optical signals coming in a single direction, or receives two groups of optical signals coming in both directions and selects one group of optical signals having better signal performance; wherein the drop multiplexer is provided with two same three-port wavelength division demultiplexers at its both sides with their pass ports connected to each other and their common ports connected to the drop fiber, so that when two same groups of wavelength division multiplexed optical signals enter the wavelength division demultiplexers through the drop fiber in both directions, only optical signals of wavelengths desired to be dropped are selected by the wavelength division demultiplexers and received through reflection ports of the wavelength division demultiplexers, and optical signals except for the optical signals dropped are passed through the pass ports of the wavelength division demultiplexers.

12. The ring network according to claim 11, wherein when the signals dropped bidirectionally have plural wavelengths, wavelength division demultiplexers of each group are equal to the wavelengths in number, and connected in serial to drop a plurality of wavelengths simultaneously.

13. The ring network according to claim 12, wherein the fiber gratings are replaced by multi-layer thin film elements.

14. The ring network according to claim 11, wherein the wavelength division demultiplexers are tunable so as to tune the optical signals dropped from both sides.

15. The ring network according to claim 11, wherein the fiber gratings are replaced by multi-layer thin film elements.

16. The ring network according to claim 1, wherein wavelengths of wavelength division multiplexed signals transmitted from the central office to the remote nodes through the drop fiber in a clockwise direction are allowed to be the same as wavelengths of wavelength division multiplexed signals transmitted from the central office to the remote nodes through the drop fiber in a counterclockwise direction; wherein when two groups of wavelength division multiplexed optical signals having the same wavelengths enter each of the remote nodes through drop demultiplexers connected to the drop fiber, the remote node selects and drops optical signals having wavelengths assigned to the remote node, and receives one group of optical signals coming in a single direction, or receives two groups of optical signals coming in both directions and selects one group of optical signals having better signal performance; wherein the drop multiplexer is provided with two same multi-channel wavelength division demultiplexers at its both sides, with their pass ports connected to each other and their common ports connected to the drop fiber, so that when two same groups of optical signals dropped in both directions have plural wavelengths, the groups of optical signals having plural wavelengths are simultaneously dropped by the multi-channel wavelength division demultiplexers.

17. The ring network according to claim 16, wherein the fiber gratings are replaced by multi-layer thin film elements.

18. A bidirectional wavelength division multiplexed self-healing ring network, comprising:

a central office;

a plurality of remote nodes;

a drop fiber connecting the central office and the remote nodes in a ring form to transmit optical signals from the central office to the remote nodes; and an add fiber connecting the central office and the remote nodes in a ring form to transmit optical signals from the remote nodes to the central office;

wherein wavelengths of wavelength division multiplexed signals transmitted from the central office through the drop fiber to the remote nodes in a clockwise direction are allowed to be the same as wavelengths of wavelength division multiplexed signals transmitted in a counterclockwise direction, and the former and the latter are modulated with different data; and wherein a transmission part of the central office modulates two groups of optical signals with different data, establishes paths of the optical signals using a 2×2 optical switch, multiplexes the optical signals using two wavelength division multiplexers, amplifies the optical signals using two optical amplifiers, and transmits the two groups of optical signals through the drop fiber in clockwise and counterclockwise directions, respectively.

19. The ring network according to claim 18, wherein each of the remote nodes selects and drops optical signals having wavelengths assigned to the remote node using a drop demultiplexer, establishes receiving paths of optical signals using a 2×2 optical switch, and receives the optical signals using two optical receivers.

20. The ring network according to claim 19, wherein when the ring network fails, remote nodes to the left of a location of the failure receive optical signals transmitted from the central office in a counterclockwise direction, establish paths of optical signals dropped using 2×2 optical switches and receive higher priority optical signals using higher priority optical receivers.

21. The ring network according to claim 19, wherein, when the ring network fails, remote nodes to the right of a location of the failure drop optical signals transmitted from the central office in a clockwise direction, establish paths of dropped optical signals using 2×2 optical switches and receive higher priority optical signals using higher priority optical receivers.

22. The ring network according to claim 19, wherein the drop demultiplexer is provided with two four-port optical circulators and the upper and the lower same fiber gratings are connected in parallel between the optical circulators, so that when two groups of wavelength division multiplexed optical signals enter the optical circulators, a path of optical signals is divided into the upper and the lower paths by the optical circulators, only optical signals of wavelengths desired to be dropped are reflected by the upper and lower same fiber gratings and received through the drop terminals of the connected to the optical circulators, and optical signals except for the optical signals dropped are passed through the optical circulators.

23. The ring network according to claim 22, wherein when the signals dropped bidirectionally have plural wavelengths, fiber gratings of each group are equal to the wavelengths in number, and connected in serial to drop a plurality of wavelengths simultaneously.

24. The ring network according to claim 23, wherein the fiber gratings are replaced by optical components each having a grating structure.

25. The ring network according to claim 23, wherein the fiber gratings are replaced by multi-layer thin film elements.

26. The ring network according to claim 22, wherein the fiber gratings are tunable so as to tune the optical signals dropped from its both sides.

27. The ring network according to claim 26, wherein the fiber gratings are replaced by optical components each having a grating structure.

28. The ring network according to claim 26, wherein the fiber gratings are replaced by multi-layer thin film elements.

29. The ring network according to claim 22, wherein the fiber gratings are replaced by optical components each having a grating structure.

30. The ring network according to claim 22, wherein the fiber gratings are replaced by multi-layer thin film elements.

31. The ring network according to claim 19, wherein the drop demultiplexer is provided with two same three-port wavelength division demultiplexers at its both sides with their pass ports connected to each other and their common ports connected to the drop fiber,
so that when two same groups of wavelength division multiplexed optical signals enter the wavelength division demultiplexers through the drop fiber in both directions, only optical signals of wavelengths desires to be dropped are selected by the wavelength division demultiplexers and received through reflection ports of the wavelength division demultiplexers, and optical signals except for the optical signals dropped are passed through the pass ports of the wavelength division demultiplexers.

32. The ring network according to claim 31, wherein when the signals dropped bidirectionally have plural wavelengths, wavelength division demultiplexers of each group are equal to the wavelengths in number, and connected in serial to drop a plurality of wavelengths simultaneously.

33. The ring network according to claim 32, wherein the fiber gratings are replaced by multi-layer thin film elements.

34. The ring network according to claim 31, wherein the wavelength division demultiplexers are tunable so as to tune the optical signals dropped from both sides.

35. The ring network according to claim 31, wherein the fiber gratings replaced by multi-layer thin film elements.

36. The ring network according to claim 19, wherein the drop demultiplexer is provided with two same multi-channel wavelength division demultiplexers at its both sides, with their pass ports being connected to each other and their common ports connected to the drop fiber,
so that when two same groups of optical signals dropped in both directions have plural wavelengths, the groups of optical signals having equal plural wavelengths are simultaneously dropped by the multi-channel wavelength division demultiplexers.

37. The ring network according to claim 36, Wherein the fiber gratings are replaced by multi-layer thin film elements.

38. The ring network according to claim 18, wherein a receiving part of the central office demultiplexes the wavelength division multiplexed optical signals transmitted through the add fiber using two demultiplexers, establishes receiving paths of optical signals using two 2×2 optical switches, and receives the optical signals using two optical receivers.

39. The ring network according to claim 38, wherein when the ring network fails, the central office demultiplexes wavelength division multiplexed optical signals transmitted from remote nodes to the left of a location of the failure in a clockwise direction using demultiplexers, establishes paths of optical signals using 2×2 optical switches and receives higher priority optical signals using higher priority optical receivers.

40. The ring network according to claim 38, wherein when the ring network fails, the central office demultiplexes wavelength division multiplexed optical signals transmitted from remote nodes to the right of a location of the failure in a counterclockwise direction using demultiplexers, establishes paths of optical signals using 2×2 optical switches and receives higher priority optical signals using higher priority optical receivers.

41. The ring network according to claim 18, wherein each of the remote nodes establishes transmission paths of optical signals using a 2×2 optical switch, adds two differently modulated groups of optical signals having the same wavelengths using an add multiplexer, and transmits the two groups of optical signals through the add fiber in both directions, respectively.

42. The ring network according to claim 41, wherein when the ring network fails, remote nodes to the left of a location of the failure add and transmit optical signals to the central office in a clockwise direction, and establish paths of optical signals using 2×2 optical switches to transmit higher priority optical signals in the clockwise direction.

43. The ring network according to claim 41, wherein when the ring network fails, remote nodes to the right of a location of the failure add and transmit optical signals to the central office in a counterclockwise direction, and establish paths of optical signals using 2×2 optical switches to transmit higher priority optical signals in the counterclockwise direction.

44. The ring network according to claim 41, wherein the add multiplexer is provided with two four-port optical circulators and the upper and the lower same fiber gratings are connected in parallel between the optical circulators,
so that when two same groups of wavelength division multiplexed optical signals enter add terminals connected to the optical circulators, a path of optical signals is divided into the upper and the lower paths by the optical circulators, and the two groups of optical signals are reflected by the upper and the lower fiber gratings and transmitted through the add fiber connected to the optical circulators in both directions.

45. The ring network according to claim 44, wherein when signals added bidirectionally have plural wavelengths, the fiber gratings of each group are equal to the wavelengths in number, and connected in serial to add a plurality of wavelengths simultaneously.

46. The ring network according to claim 45, wherein the fiber gratings are replaced by optical components each having a grating structure.

47. The ring network according to claim 44, wherein the fiber gratings are tunable so as to tune the optical signals added to both sides.

48. The ring network according to claim 47, wherein the fiber gratings are replaced by optical components each having a grating structure.

49. The ring network according to any of claims 44, wherein the fiber gratings are replaced by optical components each having a grating structure.

50. The ring network according to claim 41, wherein the add multiplexer is provided with two three-terminal wavelength division multiplexers at its both sides, with their pass ports being connected to each other and their common ports connected to the add fiber,
so that when two same groups of wavelength division multiplexed optical signals enter the add fiber, optical signals to be added are outputted by the wavelength division multiplexers through the common ports and transmitted through the add fiber in both directions.

51. The ring network according to claim 50, wherein when the signals added bidirectionally have plural wavelengths, the wavelength division multiplexers of each group are equal to the wavelengths in number, and connected in serial to add a plurality of wavelengths simultaneously.

52. The ring network according to claim 51, wherein the wavelength division multiplexers are tunable so as to tune the optical signals added to both sides.

53. The ring network according to claim 41, wherein the add multiplexer is provided with two same multi-channel wavelength division multiplexers at its both sides, with their pass ports being connected to each other and their common ports connected to the add fiber,
   so that when two same groups of optical signals added in both directions each have plural wavelengths, the groups of optical signals each having plural wavelengths are simultaneously added by the multi-channel wavelength division multiplexers.

54. The ring network according to claim 18, wherein when the ring network fails, remote nodes to the right of a location of the failure add and transmit optical signals to the central office in a clockwise direction and establish paths of optical signals using 2×2 optical switches to transmit higher priority optical signals in the clockwise.

55. A bidirectional wavelength division multiplexed self-healing ring network, comprising:
   A central office;
   A plurality of remote nodes; and
   two optical fibers connecting the central office and the remote nodes in a ring form to allow optical signals to be bidirectionally received and transmitted between the central office and the remote nodes;
   wherein one of the two optical fibers is a drop fiber for transmitting optical signals from the central office to the remote nodes and the other is an add fiber for transmitting optical signals from the remote nodes to the central office;
   wherein wavelengths of wavelength division multiplexed signals transmitted from the remote nodes to the central office through the add fiber in a clockwise direction are allowed to be the same as wavelengths of wavelength division multiplexed signals transmitted from the remote nodes to the central office through the add fiber in a counterclockwise direction,
   wherein each of the remote nodes divides optical signals into two groups of optical signals having the same wavelengths using an optical coupler, adds the two groups of optical signals using an add multiplexer, and transmits the two groups of optical signals to the central office in both directions, respectively,
   wherein the add multiplexer is provided with two four-port optical circulators and the upper and the lower same fiber gratings are connected in parallel between the optical circulators,
   so that when two same groups of wavelength division multiplexed optical signals enter add terminals connected to the optical circulators, a path of optical signals is divided into the upper and the lower paths by the optical circulators, and the two groups of optical signals are reflected by the upper and the lower fiber gratings and transmitted through the add fiber connected to the optical circulators in both directions.

56. The ring network according to claim 55, wherein when the signals added bidirectionally have plural wavelengths, fiber gratings of each group are equal to the wavelengths in number, and connected in serial to add a plurality of wavelengths simultaneously.

57. The ring network according to claim 56, wherein the fiber gratings are replaced by optical components each having a grating structure.

58. The ring network according to claim 55, wherein fiber gratings are tunable so as to tune the optical signals added to both sides.

59. The ring network according to claim 58, wherein the fiber gratings are replaced by optical components each having a grating structure.

60. The ring network according to claim 55, wherein the fiber gratings are replaced by optical components each having a grating structure.

61. A bidirectional wavelength division multiplexed self-healing ring network, comprising:
   A central office;
   A plurality of remote nodes; and
   two optical fibers connecting the central office and the remote nodes in a ring form to allow optical signals to be bidirectionally received and transmitted between the central office and the remote nodes;
   wherein one of the two optical fibers is a drop fiber for transmitting optical signals from the central office to the remote nodes and the other is an add fiber for transmitting optical signals from the remote nodes to the central office;
   wherein wavelengths of wavelength division multiplexed signals transmitted from the remote nodes to the central office through the add fiber in a clockwise direction are allowed to be the same as wavelengths of wavelength division multiplexed signals transmitted from the remote nodes to the central office through the add fiber in a counterclockwise direction.
   wherein each of the remote nodes divides optical signals into two groups of optical signals having the same wavelengths using an optical coupler, adds the two groups of optical signals using an add multiplexer, and transmits the two groups of optical signals to the central office in both directions, respectively,
   wherein the add multiplexer is provided with two three-terminal wavelength division multiplexers at its both sides, with their pass ports being connected to each other and their common ports connected to the add fiber,
   so that when two same groups of wavelength division multiplexed optical signals enter the add fiber, optical signals to be added are outputted by the wavelength division multiplexers through the common ports and transmitted through the add fiber in both directions.

62. The ring network according to claim 61, wherein when the signals added bidirectionally have plural wavelengths, the wavelength division multiplexers of each group are equal to the wavelengths in number, and connected in serial to add a plurality of wavelengths simultaneously.

63. The ring network according to claim 62, wherein the wavelength division multiplexers are tunable so as to tune the optical signals added to both sides.

64. A bidirectional wavelength division multiplexed self-healing ring network, comprising:
   A central office;
   A plurality of remote nodes; and
   two optical fibers connecting the central office and the remote nodes in a ring form to allow optical signals to be bidirectionally received and transmitted between the central office and the remote nodes;
   wherein one of the two optical fibers is a drop fiber for transmitting optical signals from the central office to the remote nodes and the other is an add fiber for transmitting optical signals from the remote nodes to the central office;

wherein wavelengths of wavelength division multiplexed signals transmitted from the remote nodes to the central office through the add fiber in a clockwise direction are allowed to be the same as wavelengths of wavelength division multiplexed signals transmitted from the remote nodes to the central office through the add fiber in a counterclockwise direction;

wherein each of the remote nodes divides optical signals into two groups of optical signals having the same wavelengths using an optical coupler, adds the two groups of optical signals using an add multiplexer, and transmits the two groups of optical signals to the central office in both directions, respectively; and wherein the add multiplexer is provided with two same multi-channel wavelength division multiplexers at its both sides, with their pass ports being connected to each other and their common ports connected to the add fiber, so that when two same groups of optical signals added in both directions each have plural wavelengths, the groups of optical signals each having plural wavelengths are simultaneously added by the multi-channel wavelength division multiplexers.

\* \* \* \* \*